(12) United States Patent
Song et al.

(10) Patent No.: US 11,312,645 B2
(45) Date of Patent: Apr. 26, 2022

(54) HIGH-CONCENTRATION ORGANIC WASTEWATER TREATMENT REACTOR

(71) Applicant: GuangXi Bossco Environmental Protection Technology, GuangXi (CN)

(72) Inventors: Hainong Song, Nanning (CN); HongXiang Zhu, Nanning (CN); Guoning Chen, Nanning (CN); Qifeng Yang, Nanning (CN); Lihai Lu, Nanning (CN); Chuanshun Liang, Nanning (CN); Xi Liu, Nanning (CN); Yongli Chen, Nanning (CN); Bufeng Huang, Nanning (CN); Lei Du, Nanning (CN); Chunhong He, Nanning (CN); Zhihong Wang, Nanning (CN)

( * ) Notice: Subject to any disclaimer, the term of this patent is extended or adjusted under 35 U.S.C. 154(b) by 11 days.

(21) Appl. No.: 16/964,456

(22) PCT Filed: Jul. 4, 2019

(86) PCT No.: PCT/CN2019/094762
§ 371 (c)(1),
(2) Date: Jul. 23, 2020

(87) PCT Pub. No.: WO2020/252819
PCT Pub. Date: Dec. 24, 2020

(65) Prior Publication Data
US 2021/0078882 A1 Mar. 18, 2021

(30) Foreign Application Priority Data
Jun. 21, 2019 (CN) .......................... 201910544409.2

(51) Int. Cl.
*C02F 3/28* (2006.01)
*C02F 101/30* (2006.01)

(52) U.S. Cl.
CPC ............ *C02F 3/2866* (2013.01); *C02F 3/284* (2013.01); *C02F 3/2846* (2013.01);
(Continued)

(58) Field of Classification Search
CPC .......................... C02F 3/2866; C02F 3/2846; C02F 2203/006; C02F 3/284; C02F 2101/30; Y02E 50/30
(Continued)

(56) References Cited

U.S. PATENT DOCUMENTS

2009/0223890 A1* 9/2009 Frankin .................. C12M 47/02
210/601
2011/0168021 A1* 7/2011 Vellinga ................ C02F 3/2846
95/259

(Continued)

FOREIGN PATENT DOCUMENTS

CA 2591522 C * 1/2013

OTHER PUBLICATIONS

Machine-generated English Translation of CN 203582580 U, dated Sep. 28, 2021.*

*Primary Examiner* — Fred Prince
(74) *Attorney, Agent, or Firm* — LeonardPatel PC

(57) ABSTRACT

The present invention discloses a high-concentration organic wastewater treatment reactor. A lower water distribution system, an upper water distribution system, a lower three-phase separator and an upper inclined plate separator are provided from bottom to top in a reactor body of the high-concentration organic wastewater treatment reactor. A gas-liquid separator is disposed on the top of the reactor body. The lower water distribution system and the upper water distribution system are connected to an influent pipe. A lower biogas ascending pipe connected to the gas-liquid separator is disposed on the top of the lower three-phase separator. An upper biogas ascending pipe and an effluent (Continued)

pipe are disposed above the upper inclined plate separator. An outlet end of the upper biogas ascending pipe is connected to the gas-liquid separator. A downcomer is disposed on the bottom of the gas-liquid separator. An air pipe is disposed on the top of the gas-liquid separator. The reactor of the present invention has the characteristics of low energy consumption, good effluent water quality, large biogas production, and no odor, is capable of enhancing the even water distribution and fully mixing sludge and water, have a high removal efficiency of pollutants. Moreover, an internal circulating water dilutes influent water. A system having a strong impact resistance ability and a reactor being operated stably for a long term are achieved.

7 Claims, 1 Drawing Sheet

(52) U.S. Cl.
CPC .... *C02F 2101/30* (2013.01); *C02F 2203/006* (2013.01); *Y02E 50/30* (2013.01)

(58) Field of Classification Search
USPC ................................. 210/600, 603, 787, 788
See application file for complete search history.

(56) References Cited

U.S. PATENT DOCUMENTS

| 2013/0206684 A1* | 8/2013 | Prins | C02F 3/1226 |
| | | | 210/608 |
| 2019/0248686 A1* | 8/2019 | de Boer | C02F 3/2873 |

\* cited by examiner

HIGH-CONCENTRATION ORGANIC WASTEWATER TREATMENT REACTOR

CROSS REFERENCE TO RELATED APPLICATION

This is a national stage application of PCT/CN2019/094762, filed Jul. 4, 2019, which claims priority to CN 201910544409.2 filed Jun. 21, 2019. The subject matter of this earlier filed application is hereby incorporated by reference in its entirety.

TECHNICAL FIELD

The present invention relates to a technical field of wastewater treatment equipment, in particular, to a high-concentration organic wastewater treatment reactor.

BACKGROUND

At present, methods of treating high-concentration organic wastewater include physical, chemical and biological methods. Among them, the physicochemical method and the chemical method have the characteristics of low removal efficiency and high treating cost and so on, and the chemicals introduced by the chemical method further forms secondary pollutants. Anaerobic technology is a biochemical treatment technology commonly used in the treatment of high-concentration organic wastewater, which is also the most economical technology for treating the high-concentration organic wastewater at present. The anaerobic technology also generates additional benefits while treating pollutants, which brings great advantages to humans in treating wastewater. Therefore, people have been working hard to develop new anaerobic technology and develop anaerobic reactors with more advantages. The anaerobic technology is a process in which organic matters in wastewater are transformed into substances such as methane, carbon dioxide and so on by microorganisms in sludge. Therefore, whether the wastewater and sludge are fully mixed is essential to the removal of organic matters. There are many methods for internal mixing of sludge and wastewater generally used in anaerobic reactors: (1) utilizing the biogas produced by itself and influent water to agitate without providing a mixing equipment. Such reactor has short-flow phenomenon therein, which affects the treating capacity, has a long startup time and is sensitive to sudden changes in water quality and load; (2) utilizing external circulating water to agitate to mix the sludge and wastewater, which is achieved by sending the water at the top of the reactor or the effluent water to the lower part of the reactor by a circulating pump to increase ascending flow rate. Such mixing method requires external power, and has high energy consumption and a dead zone; and (3) mechanical agitating, which is achieved by utilizing a motor provided at the top of the reactor to drive an agitator blade provided at the bottom of the reactor to agitate, and the agitator blade being connected to the motor by a connecting shaft. However, such method has high energy consumption, large vibration and noise, and the anaerobic reactor is usually high, and thus the connecting shaft will be too long, resulting in that it is easy to malfunction.

Therefore, currently, most of the devices used in high-concentration organic wastewater treatment projects have problems such as low treatment efficiency, high energy consumption, low organic load, uneven water distribution, weak resistance to impact load and the like.

SUMMARY

The technical problems to be solved by the present invention is to provide a high-concentration organic wastewater treatment reactor, which has advantages of low energy consumption, high removal efficiency, good effluent water quality, large biogas production, and no odor, and can overcome the problems existing in conventional devices.

The present invention solves the above technical problems with the following technical solutions:

A high-concentration organic wastewater treatment reactor of the present invention includes a reactor body. A lower water distribution system, an upper water distribution system, a lower three-phase separator and an upper inclined plate separator are provided from bottom to top in the reactor body. A gas-liquid separator is disposed on the top of the reactor body. The lower water distribution system and the upper water distribution system are both connected to an influent pipe. A lower biogas ascending pipe connected to the gas-liquid separator is disposed on the top of the lower three-phase separator. An upper biogas ascending pipe and an effluent pipe are disposed above the upper inclined plate separator. An outlet end of the upper biogas ascending pipe is connected to the gas-liquid separator. A high-load reaction zone is formed between the lower water distribution system and the lower three-phase separator. A low-load reaction zone is formed between the lower three-phase separator and the upper inclined plate separator. A downcomer extending into the high-load reaction zone is disposed on the bottom of the gas-liquid separator. An air pipe is disposed on the top of the gas-liquid separator.

A cyclone separator is connected to an outlet end of the effluent pipe of the present invention, so as to further carry out sludge-water separation.

The lower water distribution system of the present invention includes a lower water distribution pipe and a water distribution hood. The lower water distribution pipe is located below the water distribution hood. The lower water distribution pipe is provided with effluent holes. The wastewater entering into the lower water distribution pipe is sprayed out through the effluent holes, and forms an ascending swirl after passing through the water distribution hood.

The upper water distribution system of the present invention includes: an upper water distribution main pipe surrounding the outside of the reactor body; and a plurality of water distribution branch pipes, each of which has one end connected to the upper water distribution main pipe and another end extending into the reactor body and connected to a nozzle, and a plurality of nozzles are sprayed in the tangential direction of the same concentric circle.

Four water distribution branch pipes of the present invention are provided and evenly arranged, and the plurality of nozzles connected to the water distribution branch pipes are arranged in a horizontal direction.

The reactor body of the present invention is a full sealed reactor.

The lower water distribution system and the upper water distribution system of the present invention are made of stainless-steel material, and are both mounted on the reactor body by a support frame; the lower three-phase separator and the upper inclined plate separator are made of PP plate material.

The high-concentration organic wastewater treatment reactor of the present invention has the beneficial effects as follows:

1) The present invention adopts a two-tier water distribution system. The lower water distribution system swirls and distributes water at the bottom of the reactor through the lower water distribution pipe and the water distribution hood, so as to form an ascending expanded sludge bed. The upper water distribution system further increases the agitation of the sludge bed, so that the sludge and wastewater are fully mixed, achieving a good mass transfer effect. A high-load reaction zone is formed in this area, and most of the pollutants are removed in this area.

2) In the present invention, the wastewater treated in the high-load reaction zone and the low-load zone ascends to the gas-liquid separator located at the top of the reactor through the action of gas stripping of the biogas, and then returns to the bottom of the reactor under the action of gravity to mix with the influent water. Thus, the internal circulation is realized without external power, and the influent water is diluted, so that the reactor has a strong adaptability to sudden changes in influent load, a strong anti-toxicity, and thus provides a guarantee for the stable operation of the reactor.

Under the synergistic effect of the systems of the present invention, high-concentration organic wastewater in different industries can be efficiently treated. The reactor of the present invention has the characteristics of low energy consumption, high removal efficiency, good effluent water quality, large biogas production, and no odor.

In figures, 1—influent pipe, 2—lower water distribution pipe, 3—water distribution hood, 4—upper water distribution branch pipe, 5—upper water distribution main pipe, 6—nozzle, 7—lower three-phase separator, 8—downcomer, 9—lower biogas ascending pipe, 10—upper inclined plate separator, 11—gas-liquid separator, 12—cyclone separator, 13—upper biogas ascending pipe, 14—air pipe, 15—effluent pipe, 16—reactor body.

DETAILED DESCRIPTION OF THE EMBODIMENTS

In order to be able to understand the technical solution of the present invention more clearly, the technical solution of the present invention will be further described in a non-limiting manner in conjunction with the accompanying drawings and specific embodiments.

Figure 1:
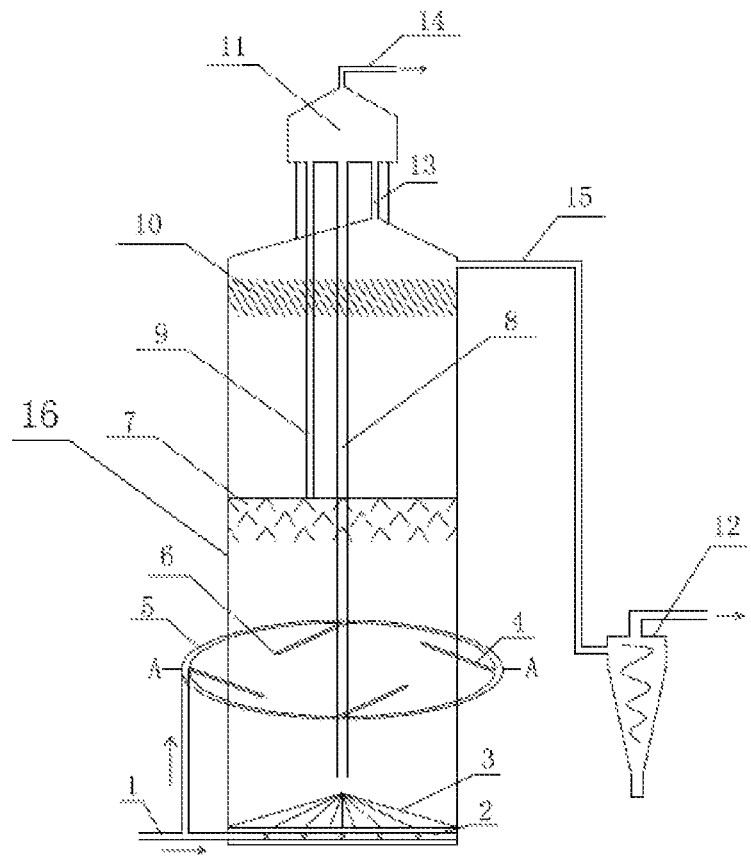
FIG. 1 is a structural schematic view of a high-concentration organic wastewater treatment reactor according to the present invention.
Figure 2:
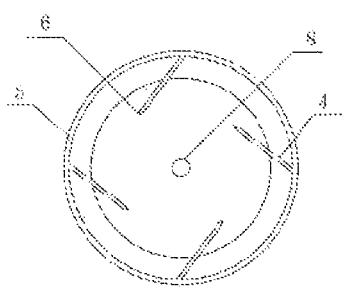
FIG. 2 is a cross-section view at line A-A in FIG. 1.

As shown in FIG. 1, a high-concentration organic wastewater treatment reactor of the present invention includes a reactor body 16 in which a lower water distribution system, an upper water distribution system, a lower three-phase separator 7 and an upper inclined plate separator 10 are provided from bottom to top. A gas-liquid separator 11 is disposed on the top of the reactor body 16. The lower water distribution system includes a lower water distribution pipe 2 and a water distribution hood 3. The lower water distribution pipe 2 is located below the water distribution hood 3. The lower water distribution pipe 2 is evenly provided with a plurality of effluent holes, the lower water distribution pipe 2 is connected to an influent pipe 1, and thus the wastewater entering into the lower water distribution pipe 2 is sprayed out through the effluent holes, and may form an ascending swirl after passing through the water distribution hood 2. The upper water distribution system includes: an upper water distribution main pipe 5 surrounding the outside of the reactor body 16; and a plurality of water distribution branch pipes 4, each of which has one end connected to the upper water distribution main pipe 5 and another end extending into the reactor body 16 and connected to a nozzle 6. A plurality of nozzles 6 are all sprayed in the tangential direction of the same concentric circle. The upper water distribution main pipe 5 is connected to the influent pipe 1. A lower biogas ascending pipe 9 connected to the gas-liquid separator 11 is disposed on the top of the lower three-phase separator 7. An upper biogas ascending pipe 13 and an effluent pipe 15 are disposed above the upper inclined plate separator 10. An outlet end of the upper biogas ascending pipe 13 is connected to the gas-liquid separator 11. A high-load reaction zone is formed between the lower water distribution system and the lower three-phase separator 7. A low-load reaction zone is formed between the lower three-phase separator 7 and the upper inclined plate separator 10. A downcomer 8 extending into the high-load reaction zone is disposed on the bottom of the gas-liquid separator 11. An air pipe 14 is disposed on the top of the gas-liquid separator 11.

In order to further carry out sludge-water separation, a cyclone separator 12 is connected to an outlet end of the effluent pipe 15.

Preferably, four water distribution branch pipes 4 are employed in this example and are evenly arranged. The plurality of nozzles 6 connected to the water distribution branch pipes 4 are arranged in a horizontal direction.

The reactor body employed by the present invention has a full sealed design, which can realize the effect of no odor being discharged.

The lower water distribution system and the upper water distribution system as described by the present invention are both made of stainless-steel material, and are both mounted on the reactor body by a support frame. The lower three-phase separator 7 and the upper inclined plate separator 10 are both made of PP plate material.

The operating process of the high-concentration organic wastewater treatment reactor of the present invention is as follows:

The wastewater enters into the lower water distribution pipe 2 of the lower water distribution system and the upper water distribution main pipe 5 of the upper water distribution system through the influent pipe 1. The wastewater is sprayed out from a plurality of water distribution holes provided on the lower water distribution pipe 2 after entering into the reactor through the lower water distribution pipe 2, forms an ascending swirl after passing through the water distribution hood 3, and is initially mixed with the anaerobic sludge. At the same time, part of the wastewater enters into the reactor through the water distribution branch pipes 4 after entering into the upper water distribution main pipe 5, and is sprayed into the reactor through the nozzles 6. Four nozzles are provided and are horizontally sprayed in the tangential direction of the same concentric circle. The water distribution method may increase the internal swirl, make the wastewater and sludge fully mixed, increase the mass transfer effect, and efficiently remove organic matters.

In the high-load reaction zone, 50% to 70% of the organic matters in the wastewater are removed. The wastewater treated in the high-load reaction zone ascends into the lower three-phase separator 7 for sludge-water separation, and then the sludge returns to the high-load reaction zone, the wastewater enters into the low-load reaction zone for further treating, and 20% to 30% of the organic matters are removed in this area. Then, the wastewater is separated into sludge and water by passing through the upper inclined plate separator 10, and then the sludge returns to the low-load reaction zone, the treated wastewater is discharged from the effluent pipe 15 located above the upper inclined plate separator 10, enters into the cyclone separator 12 under the action of gravity, and is discharged after a further sludge-water separation. The biogas produced in the high-load zone is collected by the lower three-phase separator 7 and is introduced into the gas-liquid separator 11 through the lower biogas ascending pipe 9. The biogases produced in the low-load reaction zone is introduced into the gas-liquid separator 11 by passing through the upper biogas ascending pipe 13. Therefore, the biogas produced in the low-load reaction zone and the biogas produced in the high-load reaction zone are mixed in the gas-liquid separator 11. The wastewater carried by the biogas ascending into the gas-liquid separator 11 is separated from the biogas in the gas-liquid separator 11, and then passes through the downcomer 8 to return to the top of the water distribution hood 3 and mix with the influent water. The reflux water plays a diluent effect on the influent water, greatly enhancing the ability to resist impact load and the ability to anti-toxicity of the system. The separated biogas is discharged from the air pipe 14 on the top of the gas-liquid separator 11. The top of the reactor is full sealed, and thus no odor is discharged to the surrounding environment.

The lower water distribution system and the upper water distribution system adopted in the present invention are both provided with control valves, flow meters and check valves, which can control the flow of the upper and lower water distribution systems.

The high-concentration organic wastewater treatment reactor of the present invention has the advantages of: 1) adopting a two-tier water distribution system to fully mix sludge and wastewater, increasing the mass transfer effect, and having a good removal effect; 2) enhancing the internal circulation, having high ability to resist impact load and high volume load; 3) transforming organic pollutants into biogas and reusing the resource; 4) having no odor and being environmentally friendly due to the sealed the reactor.

The following is relevant data generated by applying the high-concentration organic wastewater treatment reactor of the present invention in treating mixed wastewater produced by 1200 m$^3$/d (70% wastepaper pulp, 30% chemimechanical pulp) pulp pulping and papermaking production line in early 2019 at a paper mill in Binyang County, Nanning, Guangxi:

| | Index | | |
|---|---|---|---|
| Time | Influent COD (mg/L) | Effluent COD (mg/L) | Removal rate (%) |
| January 20 | 3192 | 1156 | 0.64 |
| January 21 | 3231 | 1287 | 0.60 |
| January 22 | 3029 | 1012 | 0.67 |
| January 23 | 2957 | 938 | 0.68 |
| January 24 | 3478 | 1149 | 0.67 |
| January 25 | 3170 | 988 | 0.69 |
| January 26 | 3055 | 1092 | 0.64 |

The above table shows the extracted operating data for seven days. It can be seen from the table that when the influent COD of the reactor of the present invention is about 3000 mg/L, the effluent water is about 1000 mg/L, the removal rate of pollutants is stable above 60%, and thus the treatment effect is better. Although the influent water has some fluctuations, but the effluent water is not affected by the fluctuations of the influent water.

It can be seen that the high-concentration organic wastewater treatment reactor of the present invention has a high removal efficiency of pollutants, the system has a strong impact resistance ability, and can be operated stably for a long term.

It should be noted that the above described preferred embodiments are only for illustrating the technical conceptions and features of the present invention, and the protection scope of the invention cannot be limited thereby. Any equivalent changes or modifications made according to the spiritual essence of the invention shall fall into the protection scope of the invention.

What is claimed is:

1. A high-concentration organic wastewater treatment reactor, comprising a reactor body, wherein,
    a lower water distribution system, an upper water distribution system, a lower three-phase separator and an upper inclined plate separator are provided from bottom to top in the reactor body,
    a gas-liquid separator is disposed on the top of the reactor body,
    the lower water distribution system and the upper water distribution system are both connected to an influent pipe,
    a lower biogas ascending pipe connected to the gas-liquid separator is disposed on the top of the lower three-phase separator,
    an upper biogas ascending pipe and an effluent pipe are disposed above the upper inclined plate separator,
    an outlet end of the upper biogas ascending pipe is connected to the gas-liquid separator,
    a high-load reaction zone is formed between the lower water distribution system and the lower three-phase separator,
    a low-load reaction zone is formed between the lower three-phase separator and the upper inclined plate separator,
    a downcomer extending into the high-load reaction zone is disposed on the bottom of the gas-liquid separator,
    an air pipe is disposed on the top of the gas-liquid separator, wherein
    the high-concentration organic wastewater treatment reactor comprises organic wastewater having COD concentration ranging from 3,000 to 6,000 mg/L,
    the high-load reaction zone is a reaction zone in a lower position in which organic ranges from 15 to 30 kg COD/m$^3$·d, and
    the low-load reaction zone is a reaction zone in the lower position in which the organic bad ranges from 0 to 1 kg COD/m$^3$·d.

2. The high-concentration organic wastewater treatment reactor according to claim 1, wherein a cyclone separator is connected to an outlet end of the effluent pipe, so as to further carry out sludge-water separation.

3. The high-concentration organic wastewater treatment reactor according to claim 1, wherein the lower water distribution system comprises a lower water distribution pipe and a water distribution hood,
    the lower water distribution pipe is located below the water distribution hood,
    the lower water distribution pipe is provided with effluent holes, the organic wastewater entering into the lower water distribution pipe is sprayed out through the effluent holes, and forms an ascending swirl after passing through the water distribution hood.

4. The high-concentration organic wastewater treatment reactor according to claim 1, wherein the upper water distribution system comprises:
- an upper water distribution main pipe surrounding the outside of the reactor body; and
- a plurality of water distribution branch pipes, each of which has one end connected to the upper water distribution main pipe and another end extending into the reactor body and connected to a nozzle,
- a plurality of nozzles are sprayed in a tangential direction of a same concentric circle.

5. The high-concentration organic wastewater treatment reactor according to claim 4, wherein four water distribution branch pipes are provided and evenly arranged, the plurality of nozzles connected to the water distribution branch pipes are arranged in a horizontal direction.

6. The high-concentration organic wastewater treatment reactor according to claim 1, wherein the reactor body is a full sealed reactor.

7. The high-concentration organic wastewater treatment reactor according to claim 1, wherein the lower water distribution system and the upper water distribution system are made of stainless-steel material, and both are mounted on the reactor body by a support frame; the lower three-phase separator and the upper inclined plate separator are both made of PP plate material.

\* \* \* \* \*